US012784706B2

(12) United States Patent
Zhao et al.

(10) Patent No.: US 12,784,706 B2
(45) Date of Patent: Nov. 3, 2026

(54) DISPLAY PANEL, DRIVE METHOD AND DRIVE CIRCUIT FOR DISPLAY PANEL, AND DISPLAY DEVICE

(71) Applicant: HKC CORPORATION LIMITED, Shenzhen (CN)

(72) Inventors: Xiao Zhao, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/408,341

(22) Filed: Dec. 3, 2025

(65) Prior Publication Data

US 2026/0188274 A1 Jul. 2, 2026

(30) Foreign Application Priority Data

Dec. 30, 2024 (CN) ........................ 202411960551.2

(51) Int. Cl.
*G09G 3/36* (2006.01)

(52) U.S. Cl.
CPC ......... *G09G 3/3677* (2013.01); *G09G 3/3688* (2013.01); *G09G 2300/0814* (2013.01); *G09G 2300/0842* (2013.01); *G09G 2310/0245* (2013.01); *G09G 2310/08* (2013.01)

(58) Field of Classification Search
CPC ... G09G 2300/0819; G09G 2300/0842; G09G 2300/0861; G09G 2310/08; G09G 2320/045; G09G 3/3233
See application file for complete search history.

(56) References Cited

U.S. PATENT DOCUMENTS 9,182,643 B1 11/2015 Ge et al.
2006/0267639 A1* 11/2006 Kobayashi ............ H03F 1/0277 327/100
2011/0141098 A1* 6/2011 Yaguma ............... G09G 3/3696 345/212

FOREIGN PATENT DOCUMENTS

CN 103218964 A 7/2013
CN 113178170 A 7/2021
CN 117095644 A 11/2023
CN 118135966 A 6/2024
CN 118298749 A 7/2024
JP 2013213913 A 10/2013

* cited by examiner

*Primary Examiner* — Insa Sadio

(57) ABSTRACT

A display panel which includes a plurality of scan lines, a plurality of data lines and an array of pixel units. The pixel units each includes a pixel electrode, a storage capacitor, a first transistor, a comparison circuit and a switch logic circuit. The comparison circuit compares a signal input by the data line with a first reference voltage and outputs a comparison signal of a corresponding high or low level. The switch logic circuit logically judges the levels of a signal input by the scan line and the comparison signal and is correspondingly switched on and off, realizing input of the row scan signal and the data signal to the first transistor, and thus whether the data signal of the pixel electrode and the storage capacitor is written and refreshed is controllable.

17 Claims, 10 Drawing Sheets

DISPLAY PANEL, DRIVE METHOD AND DRIVE CIRCUIT FOR DISPLAY PANEL, AND DISPLAY DEVICE

CROSS-REFERENCE TO RELATED APPLICATION

Pursuant to 35 U.S.C. § 119 and the Paris Convention, this application claims the benefit of Chinese Patent Application No. 202411960551.2 filed on Dec. 30, 2024, the content of which is incorporated herein by reference.

FIELD OF TECHNOLOGY

The following relates to the field of display panel technology, more particularly to a display panel, a drive method and a drive circuit for the display panel, and a display device.

BACKGROUND

The statements provided herein are merely background information related to the present application, and do not necessarily constitute any prior arts. With the advancement of display technology and market demands, high refresh rate display devices have gradually come into public view. Compared to traditional display devices, high refresh rate display devices offer advantages such as smoother visual experiences, faster response times, and reduced visual fatigue. However, in the meantime, high refresh rates also bring higher power consumption demands.

To address the contradiction between the pursuit of visual quality and power consumption demands, a localized refresh rate differentiation technique called FFR (Free Frame Rate) is proposed. When displaying static images, if it is determined that the content in a specific area remains unchanged, that area operates at a low refresh rate. Conversely, when the content in that area changes in the subsequent frame, it switches to a high refresh rate.

However, current FRR technologies are all based on the timing adjustment of multiple GOA units in the gate drive circuit, which has significant limitations. First, in the gate driver circuit, the GOA unit controls the display screen in units of at least one row, whereas the localized adjustment requirements for refresh rate based on changes in screen content are complex. For instance, when different positions within the same row require different refresh rates, this cannot be achieved.

Moreover, due to the design characteristics of the GOA unit, the FFR technology based on GOA timing adjustment requires the refresh rate of the previous row in the refresh direction to be higher than that of the next row, significantly limiting the application scenarios of this technology.

SUMMARY

It is an objective of the present application to provide a display panel, which aims to solve the problem that the driving architecture in the traditional display device cannot meet the requirement of different refresh rates at different positions.

In accordance with a first aspect of embodiments of the present application, a display panel is provided, which includes a plurality of scan lines, a plurality of data lines, and an array of pixel units, the pixel units each is correspondingly connected to one scan line and one data line.

The pixel unit includes: a pixel electrode, a storage capacitor, a first transistor, a comparison circuit and a switch logic circuit.

A first end of the storage capacitor is connected to the pixel electrode, and a second end of the storage capacitor is connected to a common signal terminal.

The first transistor is connected between the data line and the pixel electrode.

The comparison circuit is connected to the data line and a first reference voltage terminal. The comparison circuit is configured to compare a signal on the data line with a first reference voltage at the first reference voltage terminal and output a comparison signal.

The switch logic circuit is connected to an output end of the comparison circuit, a control end of the first transistor and the scan line. The switch logic circuit is configured to trigger a connection between the scan line and the first transistor when the comparison signal and the signal on the scan line are both at a high level, or trigger a disconnection of the scan line and the first transistor when one of the comparison signal and the signal on the scan line is at a low level.

Optionally, the switch logic circuit includes: an AND gate and a switch circuit connected in series between the scan line and the first transistor.

A first input end of the AND gate is connected to the scan line, and a second input end of the AND gate is connected to the output end of the comparison circuit.

A control end of the switch circuit is connected to an output end of the AND gate, the switch circuit is triggered to switch on by a high level and is triggered to switch off by a low level.

Optionally, the AND gate includes a first diode and a second diode.

A cathode of the first diode is connected to the scan line, an anode of the first diode, an anode of the second diode and a second reference voltage terminal are connected serving as a signal output terminal of the AND gate. A cathode of the second diode is connected to the output end of the comparison circuit, and a second reference voltage at the second reference voltage terminal is lower than a voltage of a row enable signal input to the scan line.

Optionally, the switch circuit includes a second transistor and a bootstrap capacitor.

A first end of the second transistor is connected to the scan line, a second end of the second transistor is connected to the control end of the first transistor, a control end of the second transistor and a first end of the bootstrap capacitor are connected serving as the control end of the switch circuit, and a second end of the bootstrap capacitor is grounded.

Optionally, the comparison circuit includes a third transistor, a fourth transistor, a fifth transistor and a resistor.

A first end of the third transistor is connected to the first reference voltage terminal, a second end of the third transistor, a first end of the resistor, a control end of the fourth transistor and a control end of the fifth transistor are connected in common. A control end of the third transistor is connected to the data line, a first end of the fourth transistor is connected to a second reference voltage terminal, a second end of the fourth transistor and a first end of the fifth transistor are connected serving as the output end of the comparison circuit, and the second end of the fifth transistor is grounded.

In accordance with a second aspect of the embodiments of the present application a drive method for a display panel is provided, applied to drive the above-mentioned display panel. The drive method for the display panel includes steps of:

determining whether an image content of a next frame in a target local area of the display panel changes;

switching to a retention mode when the image content of the next frame in the target local area does not change, and during a next frame scan driving, outputting a first data signal of a corresponding magnitude and a row enable signal to a target pixel unit corresponding to the target local area, and controlling the pixel electrode of the target pixel unit to maintain a data signal of a previous frame; and switching to an active mode when the image content of the next frame in the target local area changes, and during the next frame scan driving, outputting a second data signal of a corresponding magnitude and the row enable signal to the target pixel unit corresponding to the target local area, and controlling the pixel electrode of the target pixel unit to input a data signal of a current frame.

Optionally, the step of switching to the retention mode when the image content of the next frame in the target local area does not change, and during the next frame scan driving, outputting the first data signal of the corresponding magnitude and the row enable signal to the target pixel unit corresponding to the target local area includes steps of:

in a first time period of the retention mode, outputting the row enable signal of a high level to the scan line, and outputting a first enable signal or outputting no signal to the data line, a voltage of the first enable signal is lower than the first reference voltage; and in a second time period of the retention mode, outputting the row enable signal to the scan line, and outputting the data signal of the next frame to the data line or outputting no signal to the data line.

Optionally, the step of switching to the active mode when the image content of the next frame in the target local area changes, and during the next frame scan driving, outputting the second data signal of the corresponding magnitude and the row enable signal to the target pixel unit corresponding to the target local area includes steps of:

in a first time period of the active mode, outputting the row enable signal to the scan line, and outputting a second enable signal to the data line, a voltage of the second enable signal is higher than the first reference voltage;

in a second time period of the active mode, outputting the row enable signal to the scan line, and outputting a data signal of the next frame to the data line, where the data signal of the next frame is output to the pixel electrode of the target pixel unit through the first transistor; and in a third time period of the active mode, outputting a row disable signal of a low level to the scan line, and controlling the pixel electrode of the target pixel unit to maintain the data signal of the current frame.

In accordance with a third aspect of the embodiments of the present application, a drive circuit for a display panel is provided. The drive circuit includes a source drive circuit, a gate drive circuit and a timing controller.

The timing controller is connected to the source drive circuit and the gate drive circuit respectively, and is configured to output a control signal to the source drive circuit and the gate drive circuit to implement the drive method for the display panel.

In accordance with a fourth aspect of the present application, a display device is provided, which includes the display panel and the drive circuit for the display panel as disclosed above. The drive circuit for the display panel is connected to the display panel.

Compared with the existing technologies, the display panel has the following beneficial effects: the display panel includes a plurality of scan lines, a plurality of data lines and an array of pixel units. The pixel units each includes a pixel electrode, a storage capacitor, a first transistor, a comparison circuit and a switch logic circuit. The comparison circuit compares a signal input by the data line with a first reference voltage and outputs a comparison signal corresponding to a high or low level, the switch logic circuit logically judges the levels of a signal input by the scan line and the comparison signal and is correspondingly switched on or off, realizing input of the row scan signal and the data signal to the first transistor, and thus whether the data signal of the pixel electrode and the storage capacitor is written and refreshed is controllable. By inputting data signals of varying magnitudes and the row scan signal to the data lines and the scan lines, the pixel units can be controlled to maintain the current image or switch display frames, enabling independent control of individual pixel units to meet display requirements at different refresh rates.

BRIEF DESCRIPTION OF THE DRAWINGS

To provide a clearer illustration of technical schemes in embodiments of the present application, the drawings that required for describing the embodiments will be briefly introduced below. Obviously, the drawings in the following description are merely some embodiments of the present application. For persons of ordinary skill in the art, other drawings may also be obtained from these drawings without creative effort.

DETAILED DESCRIPTION OF THE EMBODIMENTS

To make the technical problem to be solved, technical schemes and beneficial effects of the present application clearer and more comprehensible, the present application is further described in detail below in conjunction with the drawings and embodiments. It should be understood that the specific embodiments described herein are merely illustrative of the present application and are not intended to limit the present application.

In addition, the terms "first" and "second" are used only for the purpose of description, and should not be construed as indicating or implying relative importance or implicitly indicating the quantity of the indicated technical features. Thus, the features qualified with "first" and "second" may explicitly or implicitly include one or more of such features. In the description of the present application, the term "a plurality of" means two or more, unless otherwise explicitly and specifically defined.

Figure 1:
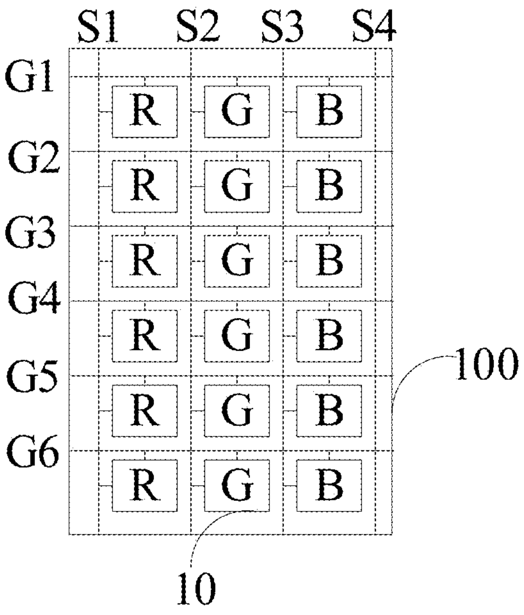
FIG. 1 is a structural schematic diagram of a display panel provided by an embodiment of the present application.
Figure 2:
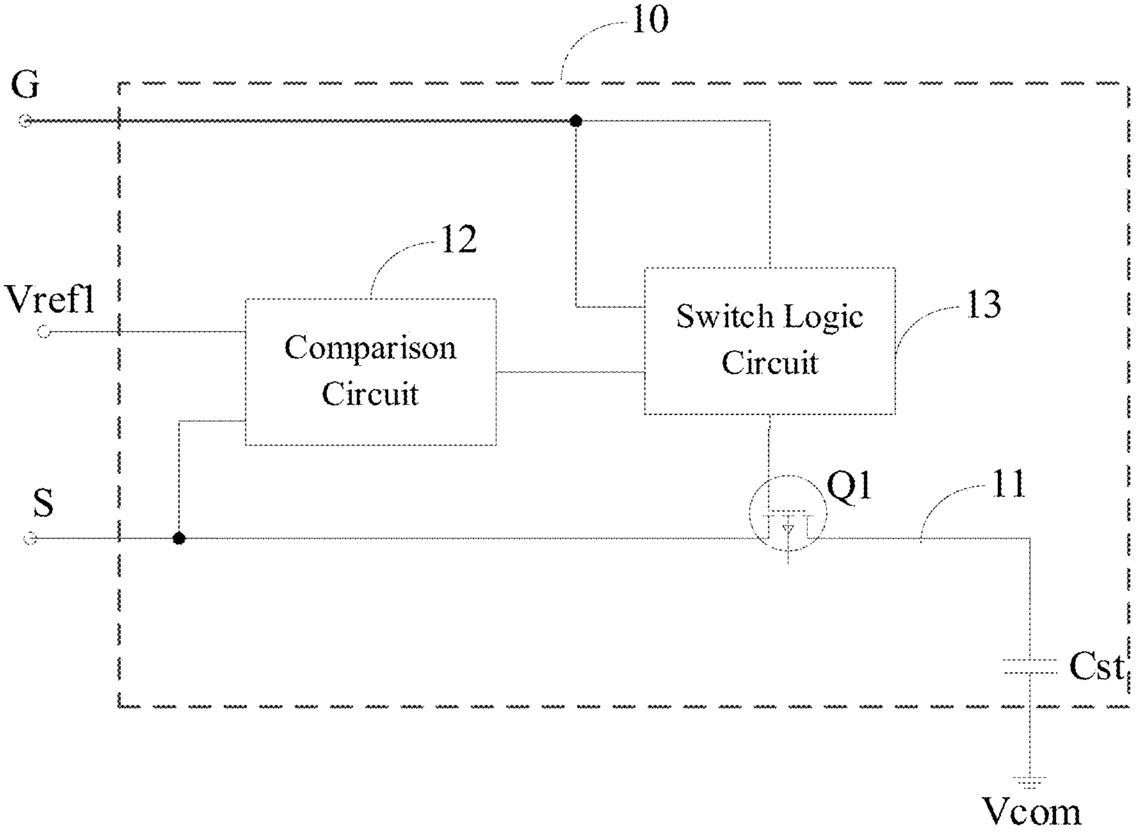
FIG. 2 is a first circuit schematic diagram of a pixel unit provided by an embodiment of the present application.

In a first aspect, an embodiment of the present application provides a display panel 100, as shown in FIG. 1, the display panel 100 includes a plurality of scan lines G, a plurality of data lines S and an array of pixel units 10, the pixel units 10 each is correspondingly connected to one scan line G and one data line S. The display panel 100 also includes an array substrate, a color film substrate and a liquid crystal layer arranged between the array substrate and the color film substrate. The scan lines G, the data lines S and the array of pixel units 10 are arranged on the array substrate, as shown in FIG. 2. The pixel units 10 each includes a pixel electrode 11, the color film substrate is provided with a color film layer and a common electrode layer. The common electrode layer has a first common electrode voltage. The data signal Vdata input to the pixel electrode 11 forms a driving voltage with the first common electrode voltage, drives a liquid crystal deflection in the liquid crystal layer, and cooperates with the color film layer to control the pixel unit 10 to display corresponding image information.

To achieve independent control of each pixel unit 10 or a target pixel unit in a target local area and meet the requirements of different refresh rates, the pixel unit 10 also includes: a storage capacitor Cst, a first transistor Q1, a comparison circuit 12 and a switch logic circuit 13.

A first end of the storage capacitor Cst is connected to the pixel electrode 11, and a second end of the storage capacitor Cst is connected to a common signal terminal.

The first transistor Q1 is connected between the data line S and the pixel electrode 11.

The comparison circuit 12 is connected to the data line S and a first reference voltage terminal. The comparison circuit 12 is configured to compare a signal on the data line S with a first reference voltage Vref1 at the first reference voltage terminal and output a comparison signal;

The switch logic circuit 13 is in connection with an output end of the comparison circuit 12, a control end of the first transistor Q1 and the scan line G. The switch logic circuit 13 is configured to trigger a connection between the scan line G and the first transistor Q1 when the comparison signal and a signal on the scan line G are both at a high level, or trigger a disconnection between the scan line G and the first transistor Q1 when one of the comparison signal and the signal on the scan line G is at a low level.

The storage capacitor Cst is connected between a common electrode on the array substrate and the pixel electrode 11, the common electrode is used for inputting a second common electrode voltage Vcom. The storage capacitor Cst is configured for storing a data signal Vdata of a current frame and storing a refreshed data signal Vdata when a data signal Vdata of a next frame is written.

"The first transistor Q1 serves as the driving transistor within pixel unit 10, enabling control over writing the data signal Vdata. The pixel unit 10 may operate in either an active mode or a retention mode: the active mode allows refreshing of the input data signal Vdata, while the retention mode maintains the data signal Vdata from the previous frame.

Here, during progressive scanning, when targeting specific pixel units in the local display area, the number of these target pixel units may range from one to multiple.

In the active mode, a row enable signal VGH is input to the switch logic circuit 13 when the row enable signal VGH is received by the target pixel unit; and a high-level comparison signal is output from the comparison circuit 12 when the selected input data signal Vdata is higher than the first reference voltage Vref1. The switch logic circuit 13 is triggered to connect the scan line G and the first transistor Q1 after receiving the two high-level signals, thus the row enable signal VGH is input to the first transistor Q1, and the first transistor Q1 is triggered to switch on by the row enable signal VGH, at this time, the data signal Vdata may be input to the pixel electrode 11 and the storage capacitor Cst through the first transistor Q1, then the storage capacitor Cst may be charged, a terminal voltage of the storage capacitor is refreshed to the voltage of the input data signal Vdata, and the voltage at the pixel electrode 11 is stably maintained at the refreshed data signal Vdata. The data signal Vdata forms a driving voltage with the common electrode layer to drive the deflection of liquid crystals in the liquid crystal layer, and cooperates with the color filter layer to control the pixel unit 10 to display corresponding image information, thereby a high refresh rate for the local image is achieved.

In the retention mode, a low-level comparison signal is output from the comparison circuit 12 when the selected input data signal Vdata is lower than the first reference voltage Vref1 and/or the row enable signal VGH is not input, the switch logic circuit 13 is triggered to switch off, at this time, the first transistor Q1 has no control signal input, the data signal Vdata cannot be written, and the storage capacitor Cst maintains the voltage of the pixel electrode 11 stable at the data signal Vdata input in the previous frame. The data signal Vdata forms a driving voltage with the common electrode layer to drive the deflection of liquid crystals in the liquid crystal layer, and cooperates with the color filter layer to control the pixel unit 10 to display corresponding image information, thereby a low refresh rate of the local image is achieved.

Thus, the pixel unit 10 is enabled to refresh or maintain the data signal Vdata under the control of the dual signals of the data signal Vdata and the input row scan signal, so that the control of the refresh rate of the target pixel unit can be achieved.

For example, when it is required to control two pixel units 10 in adjacent columns in the same row to have different refresh rates, the same row enable signal VGH may be input to the two pixel units 10 in this row, and data signals Vdata of varying magnitudes are respectively input, for example, the data signal Vdata input to the pixel unit 10 in a first column is higher than the first reference voltage Vref1, and the data signal Vdata input to the pixel unit 10 in a second column is lower than the first reference voltage Vref1. The pixel unit 10 in the first column may store the data signal Vdata refreshed and written in this frame, achieving a high refresh rate, while the pixel unit 10 in the second column stores the data signal Vdata written in the previous frame, achieving a low refresh rate.

Similarly, when it is required to control two pixel units 10 in adjacent rows in the same column to have different refresh rates, the row enable signal VGH may be input to the two pixel units 10 in this column row by row, and data signals Vdata of varying magnitudes are respectively input during row scanning. For example, the data signal Vdata higher than the first reference voltage Vref1 is input when scanning the pixel unit 10 in a first row, and the data signal Vdata lower than the first reference voltage Vref1 is input when scanning the pixel unit 10 in a second row. The pixel unit 10 in the first row may store the data signal Vdata refreshed and written in this frame, which achieves the high refresh rate, and the pixel unit 10 in the second row stores the data signal Vdata written in the previous frame, which achieves the low refresh rate.

In an embodiment, to ensure that the written data signal Vdata meets the current gray scale data requirement and avoid display abnormality, the data signal Vdata written by the data line S is input with varying magnitudes at different time periods. The data signal Vdata input each time includes an enable signal and a target data signal Vdata from preceding and subsequent time periods, an enable signal higher than or lower than the first reference voltage Vref1 is input in a first time period of the row enable signal VGH writing. The on-off of the switch logic circuit 13 is controlled by the enable signal, and the writing of the row enable signal VGH of the first transistor Q1 is controllable by the enable signal. A target data signal Vdata meeting the current gray scale requirement is input in a second time period of the row enable signal VGH writing. The target data signal Vdata is selected to be written to the pixel electrode 11 or cut off from outputting to the pixel electrode 11 through the first transistor Q1, so as to drive the pixel unit 10 to display the target gray scale and image.

Figure 3:
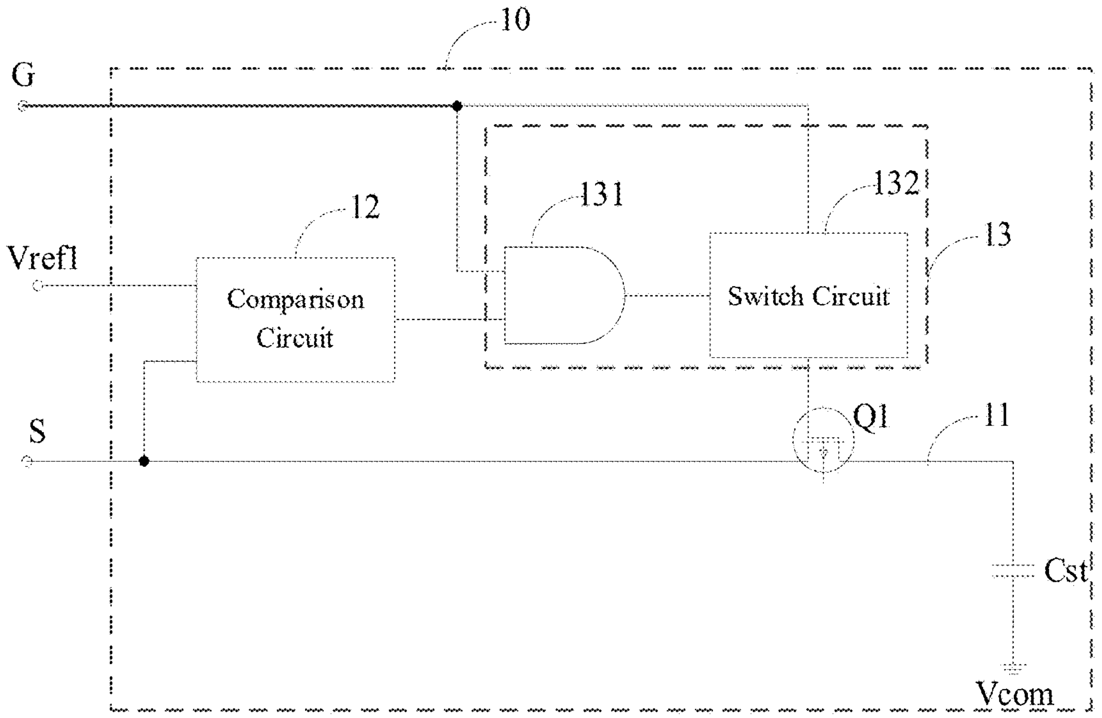
FIG. 3 is a second circuit schematic diagram of the pixel unit provided by an embodiment of the present application.

In an embodiment, the switch logic circuit 13 may adopt corresponding logic gates, switches, and other structures. In an optional embodiment, as shown in FIG. 3, the switch logic circuit 13 includes: an AND gate 131 and a switch circuit 132.

A first input end of the AND gate 131 is connected to the scan line G, and a second input end of the AND gate 131 is connected to an output end of the comparison circuit 12.

The switch circuit 132 is connected in series between the scan line G and the first transistor Q1, and a control end of the switch circuit 132 is connected to an output end of the AND gate 131. The switch circuit 132 is triggered to be switch on by a high level and is triggered to switch off by a low level.

In this embodiment, when the input data signal Vdata is higher than the first reference voltage Vref1 and the comparison circuit 12 outputs a high-level comparison signal, and when the row enable signal VGH is input, the AND gate 131 outputs a high level, the switch circuit 132 is triggered on to establish an electrical connection between the scan line G and the first transistor Q1, at this time, the row enable signal VGH can be written into the first transistor Q1 and control the first transistor Q1 to be triggered on, in the meantime, the data signal Vdata can be written, the pixel unit 10 can store the data signal Vdata refreshed and written in this frame, and a high refresh rate is achieved.

Also, when the input data signal Vdata is lower than the first reference voltage Vref1 and the comparison circuit 12 outputs a low level signal, and/or the scan line G inputs a low-level row disable signal VGL, the AND gate 131 outputs a low level, the switch circuit 132 is triggered off, at this time, the first transistor Q1 has no control signal input, the first transistor Q1 remains off, in this case, the data signal Vdata cannot be written, the pixel unit 10 stores the data signal Vdata written in the previous frame, and a low refresh rate is achieved.

Figure 4:
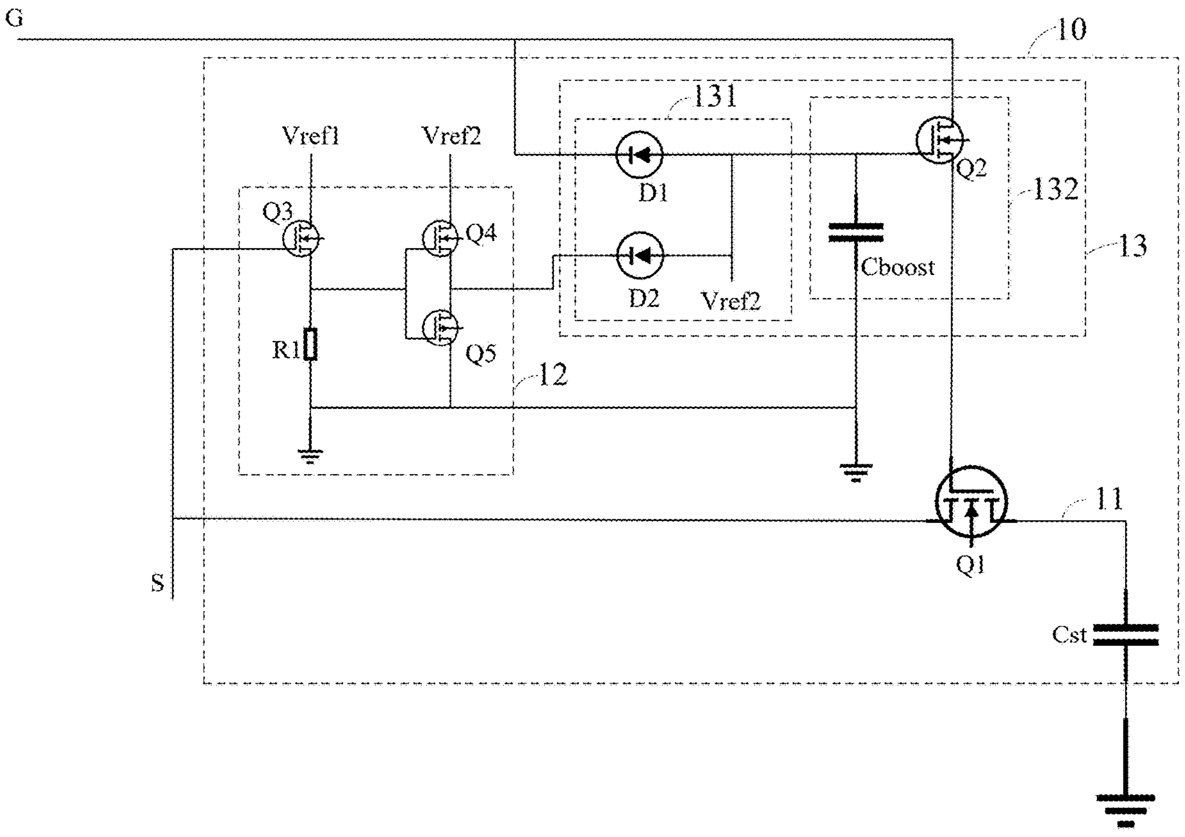
FIG. 4 is a third circuit schematic diagram of the pixel unit provided by an embodiment of the present application.

To simplify the circuit structure, the AND gate 131, the switch circuit 132 and the comparison circuit 12 may be composed of corresponding transistors. In an optional embodiment, as shown in FIG. 4, the AND gate 131 includes a first diode D1 and a second diode D2.

A cathode of the first diode D1 is connected to the scan line G. An anode of the first diode D1, an anode of the second diode D2 and a second reference voltage terminal are connected serving as a signal output terminal of the AND gate 131. A cathode of the second diode D2 is connected to the output end of the comparison circuit 12. The second reference voltage Vref2 at the second reference voltage terminal is lower than the voltage of the row enable signal VGH input to the scan line G.

The switch circuit 132 includes a second transistor Q2 and a bootstrap capacitor Cboost.

A first end of the second transistor Q2 is connected to the scan line G. A second end of the second transistor Q2 is connected to a control end of the first transistor Q1. A control end of the second transistor Q2 and a first end of the bootstrap capacitor Cboost are connected serving as the control end of the switch circuit 132, and a second end of the bootstrap capacitor Cboost is grounded.

The comparison circuit 12 includes a third transistor Q3, a fourth transistor Q4, a fifth transistor Q5 and a resistor R1.

A first end of the third transistor Q3 is connected to the first reference voltage terminal. A second end of the third transistor Q3, a first end of the resistor R1, a control end of the fourth transistor Q4 and a control end of the fifth transistor Q5 are connected in common. A control end of the third transistor Q3 is connected to the data line S. A first end of the fourth transistor Q4 is connected to the second reference voltage terminal. A second end of the fourth transistor Q4 and a first end of the fifth transistor Q5 are connected serving as the output end of the comparison circuit 12, and a second end of the fifth transistor Q5 is grounded.

In this embodiment, the pixel unit 10 is operable in the active mode and the retention mode. In case of operating in the active mode, the enable signal initially input is higher than the first reference voltage Vref1, the third transistor Q3 is triggered to switch on, the fourth transistor Q4 is triggered to switch on, the fifth transistor Q5 is triggered to switch off, and a high level is output from the comparison circuit 12, the first diode D1 is cut off, a high level is input to the control end of the second transistor Q2, the second transistor Q2 is triggered to switch on, at this time, the first transistor Q1 is triggered to switch on by the row enable signal VGH input by the scan line G. In a second phase of the active mode, the control end of the second transistor Q2 is maintained at a high level due to the existence of the bootstrap capacitor Cboost, the second transistor Q2 and the first transistor Q1 remain on, the target data signal Vdata can be written into the pixel electrode 11 and the storage capacitor Cst through the first transistor Q1, the pixel unit 10 can store the data signal Vdata written in the frame refresh, and a high refresh rate is achieved.

In the retention mode, in a first time period T11 of the retention mode, an enable signal lower than the first reference voltage Vref1 may be input, the third transistor Q3 is triggered to switch off, the fourth transistor Q4 and the fifth transistor Q5 are triggered to switch off, the first diode D1 is cut off, the control end of the second transistor Q2 is at a low level due to the reset of the previous frame, the second diode D2 is conductive or cut off, the second transistor Q2 is triggered to switch off, the first transistor Q1 is not controlled by the row scan signal input by the scan line G, and the first transistor Q1 maintains an off state.

In a second time period T12 of the retention mode, which is a data writing phase, since the first transistor Q1 maintains the off state, at this time, the data signal Vdata can be selected to be written or directly not written, the storage capacitor Cst and the pixel electrode 11 maintain the data signal Vdata of the previous frame, thereby, high and low refresh rates are achieved.

Figure 5:
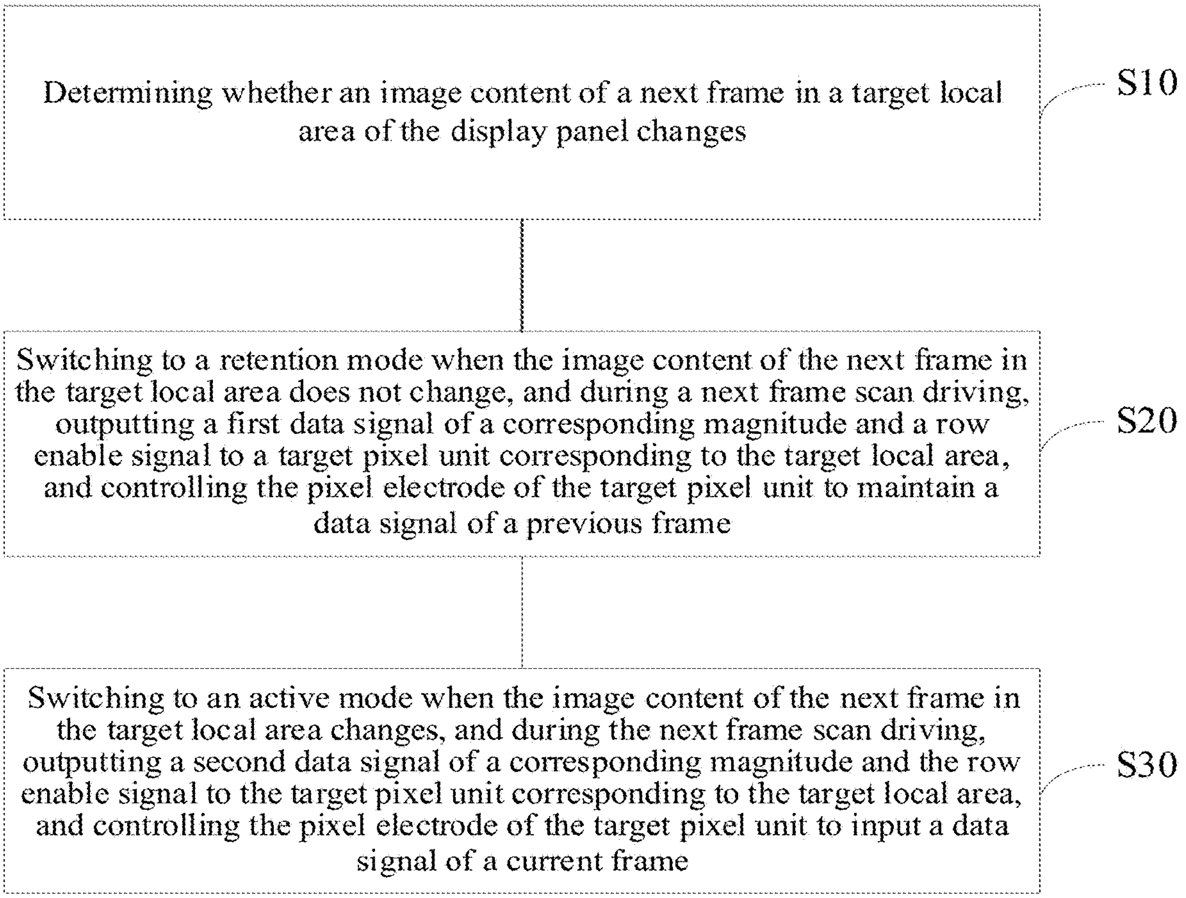
FIG. 5 is a schematic flowchart of a drive method for a display panel provided by an embodiment of the present application.

In a second aspect, an embodiment of the present application provides a drive method for the display panel 100, applicable to drive the above display panel 100. As shown in FIG. 5, the drive method for the display panel 100 includes steps S10-S30.

In step S10, it is determined whether an image content of a next frame in the target local area of the display panel 100 is changed.

In step S20, when the image content of the next frame in the target local area does not change, the retention mode is switched to, and during a next frame scan driving, the first data signal Vdata of a corresponding magnitude and the row enable signal VGH are output to the target pixel unit corresponding to the target local area, and the pixel electrode 11 of the target pixel unit is controlled to maintain the data signal Vdata of the previous frame.

In this embodiment, when a static image is displayed in the target local area, characteristic values of subsequent frames may be analyzed to determine whether changes occur in the target local area. When it is determined that the display content in the target local area remains unchanged, the target local area is set to a low refresh rate, at this time, the retention mode is switched to, the data signal Vdata output to the pixel unit 10 may be selected to be lower than the first reference voltage Vref1 and/or the row enable signal VGH is not output to the pixel unit 10, the comparison circuit 12 of the pixel unit 10 outputs a low-level comparison signal, the switch logic circuit 13 of the pixel unit 10 is triggered to switch off. In this case, the first transistor Q1 of the pixel unit 10 has no control signal input, the data signal Vdata cannot be written, the storage capacitor Cst maintains the voltage of the pixel electrode 11 to be stable at the data signal Vdata input in the previous frame. The data signal Vdata forms a driving voltage with the common electrode layer to drive the liquid crystal deflection of the liquid crystal layer, and cooperates with the color film layer to control the pixel unit 10 to display corresponding image information, thereby the low refresh rate of the local image is achieved.

Figure 6:
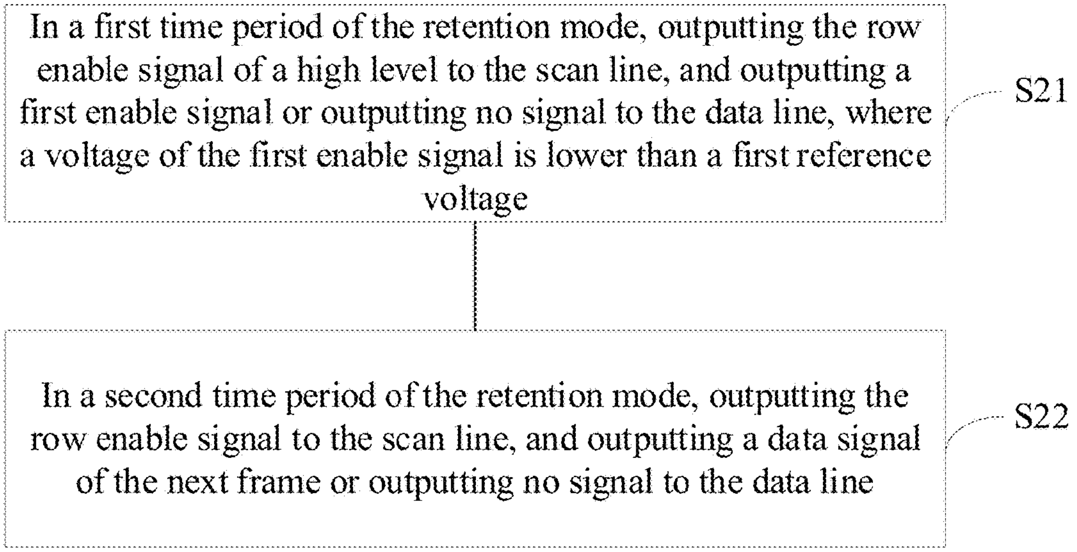
FIG. 6 is a schematic flowchart of step S20 of the drive method for the display panel shown in FIG. 5.
Figure 7:
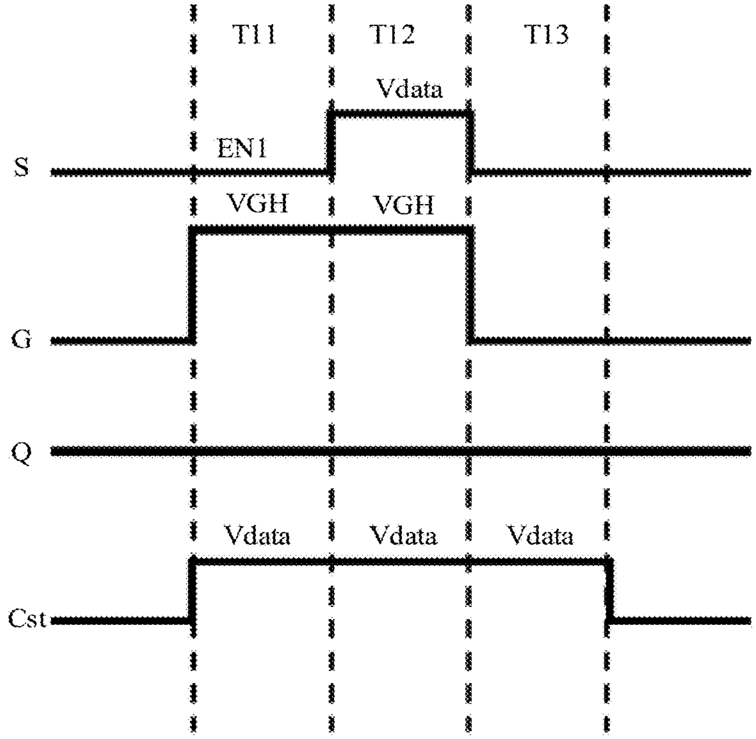
FIG. 7 is a schematic diagram of a first signal timing of a pixel unit provided by an embodiment of the present application.
Figure 8:
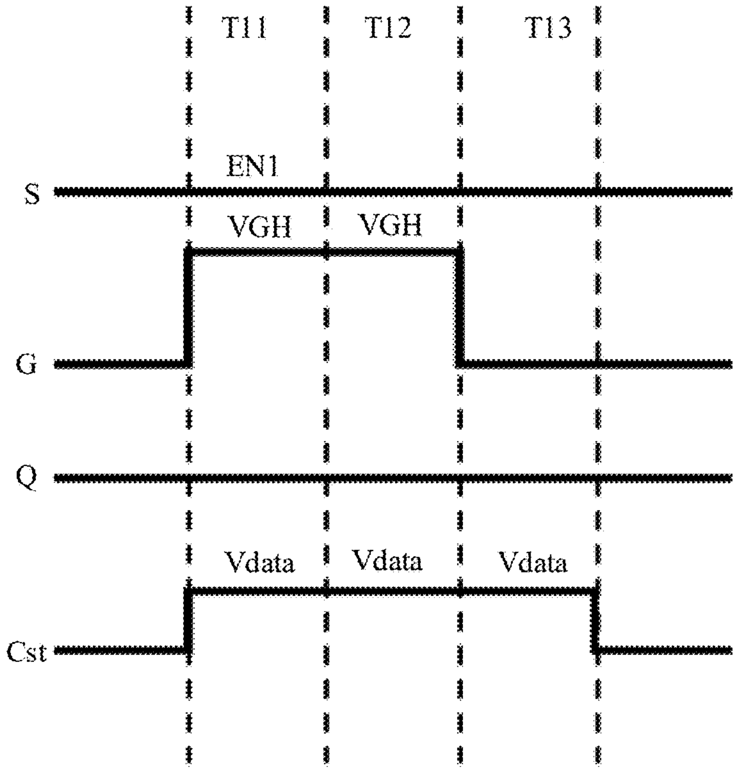
FIG. 8 is a schematic diagram of a second signal timing of the pixel unit provided by an embodiment of the present application.

Herein, to ensure that the written data signal Vdata meets the current gray scale data requirement and avoid display abnormality, the data signal Vdata written by the data line S is input with varying magnitudes at different time periods, and the data signal Vdata input each time may include the enable signal and the target data signal Vdata of the previous and subsequent time periods. Correspondingly, as shown in FIGS. 6 to 8, the step S20 includes steps S21-S22.

In step S21, in the first time period T11 of the retention mode, the row enable signal VGH of a high level is output to the scan line G, and a first enable signal EN1 or no signal is output to the data line S. The first enable signal EN1 has a voltage lower than the first reference voltage Vref1.

In step S22, in the second time period T12 of the retention mode, the row enable signal VGH is output to the scan line G, and the data signal Vdata of the next frame is output to the data line S or no signal is output to the data line S.

In this embodiment, the first enable signal EN1 is lower than the first reference voltage Vref1, the first enable signal EN1 may have a voltage value of a corresponding magnitude or a voltage value of zero, in the first time period T11 of the retention mode, the comparison signal output from the comparison circuit 12 of the pixel unit 10 is at a low level, the switch logic circuit 13 of the pixel unit 10 is triggered to switch off, at this time, the first transistor Q1 of the pixel unit 10 has no control signal input, and the data signal Vdata cannot be written. In the second time period T12 of the retention mode, the row enable signal VGH is maintained at a high level, at this time, as shown in FIG. 7, the data signal Vdata of the next frame may be selected to be output, or as shown in FIG. 8, the data signal Vdata of the next frame is not output, the storage capacitor Cst maintains the voltage of the pixel electrode 11 to be stable at the data signal Vdata input in the previous frame. The data signal Vdata of the previous frame forms the driving voltage with the common electrode layer to drive the liquid crystal deflection of the liquid crystal layer, and cooperates with the color film layer to control the pixel unit 10 to display the corresponding image information, thereby the low refresh rate of the local image can be achieved.

In step S30, when the image content of the next frame in the target local area changes, the active mode is switched to, and during the next frame scan driving, the second data signal Vdata and the row enable signal VGH of a corresponding magnitude are output to the target pixel unit corresponding to the target local area, and the pixel electrode 11 of the target pixel unit is controlled to input the data signal Vdata of the current frame.

When it is determined that the next frame in the target local area has a change, the target local area is set to a high refresh rate, in this case, the active mode is switched to, optionally, the row enable signal VGH and optionally the data signal Vdata higher than the first reference voltage Vref1 may be output to the target pixel unit in the target local area. The row enable signal VGH is input to the switch logic circuit 13, the comparison signal of a high level is output from the comparison circuit 12. The switch logic circuit 13, after receiving the two high-level signals, is triggered on to establish an electrical connection between the scan line G and the first transistor Q1, thus the row enable signal VGH is input to the first transistor Q1. The first transistor Q1 is triggered to switch on by the row enable signal VGH, at this time, the data signal Vdata may be input to the pixel electrode 11 and the storage capacitor Cst through the first transistor Q1, the storage capacitor Cst may be charged, the voltage of the pixel electrode 11 is switched and maintained to be stable at the data signal Vdata refreshed in the next frame. The data signal Vdata forms a driving voltage with the common electrode layer to drive the liquid crystal deflection of the liquid crystal layer, and cooperates with the color film layer to control the pixel unit 10 to display the corresponding image information, thereby the high refresh rate of the local image can be achieved.

Figure 9:
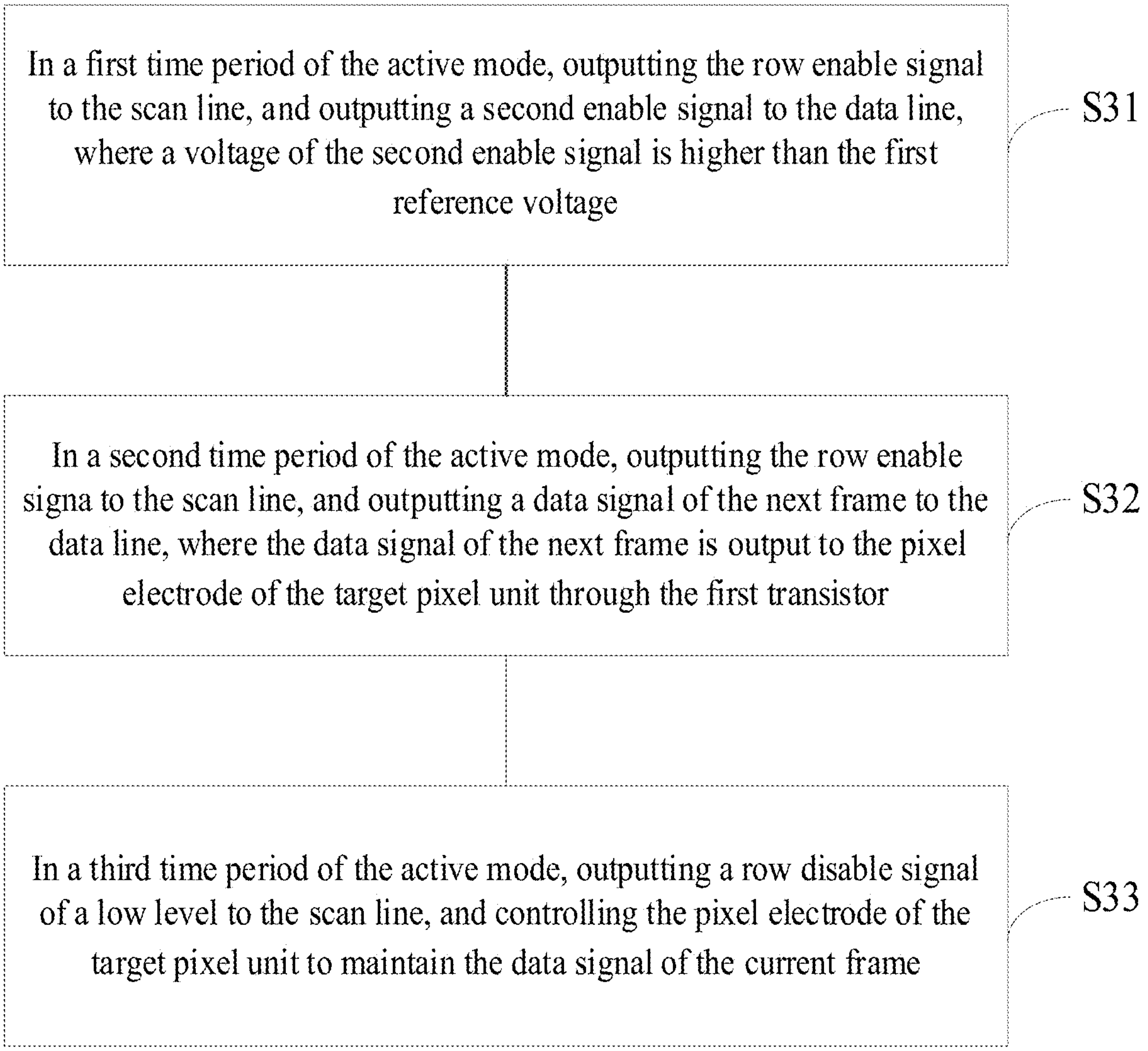
FIG. 9 is a schematic flowchart of step S30 of the drive method for the display panel shown in FIG. 5.
Figure 10:
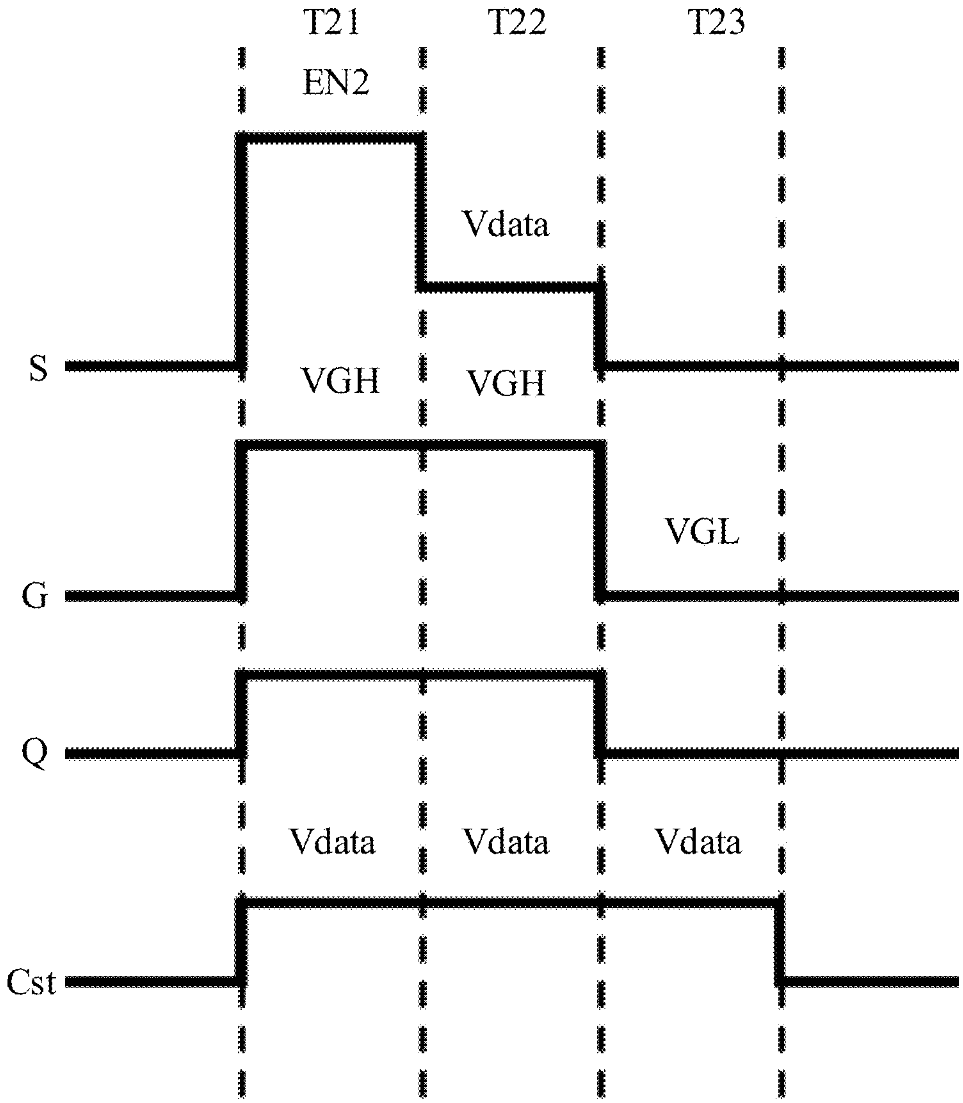
FIG. 10 is a schematic diagram of a third signal timing of the pixel unit provided by an embodiment of the present application.

Herein, to ensure that the written data signal Vdata meets the current gray scale data requirement and avoid display abnormality, the data signal Vdata written by the data line S is input with varying magnitudes at different time periods, and the data signal Vdata input each time may include the enable signal and the target data signal Vdata of the previous and subsequent time periods. Correspondingly, in an optional embodiment, as shown in FIGS. 9 and 10, the step S30 includes steps S31-S33.

In step S31, in a first time period T21 of the active mode, the row enable signal VGH is output to the scan line G and a second enable signal EN2 is output to the data line S. The second enable signal EN2 has a voltage higher than the first reference voltage Vref1.

In step S32, in a second time period T22 of the active mode, the row enable signal VGH is output to the scan line G, the data signal Vdata of the next frame is output to the data line S, and the data signal Vdata of the next frame is output to the pixel electrode 11 of the target pixel unit through the first transistor Q1.

In step S33, in a third time period T23 of the active mode, a low-level row disable signal VGL is output to the scan line G and the pixel electrode 11 of the target pixel unit is controlled to maintain the data signal Vdata of the current frame In the first time period T21 of the active mode, the row enable signal VGH is at a high level, the second enable signal EN2 is higher than the first reference voltage Vref1, the comparison signal output from the comparison circuit 12 is at a high level, the switch logic circuit 13 is triggered to establish an electrical connection between the scan line G and the first transistor Q1, thus the row enable signal VGH is input to the first transistor Q1, and the first transistor Q1 is triggered to switch on by the row enable signal VGH.

In the second time period T22 of the active mode, the data signal Vdata of the next frame is output to the pixel electrode 11 and the storage capacitor Cst through the switched-on first transistor Q1. The storage capacitor Cst can be charged, the voltage of the pixel electrode 11 is switched and maintained to be stable at the data signal Vdata refreshed in the next frame. The data signal Vdata forms a driving voltage with the common electrode layer to drive liquid crystal deflection of the liquid crystal layer, and cooperates with the color film layer to control the pixel unit 10 to display corresponding image information, so that the high refresh rate of a local image can be achieved.

In the third time period T23 of the active mode, the row enable signal VGH is scanned to the next row, the row scan signal of the target pixel unit is switched to the row disable signal VGL, a potential at the control end of the second transistor Q2 drops, the second transistor Q2 and the first transistor Q1 are triggered to switch off, and the storage capacitor Cst in the target pixel unit latches the data signal Vdata of the current frame until the next data refresh.

Thus, by inputting the data signal Vdata of a corresponding magnitude and the input row scan signal, the on/off state of pixel unit 10 can be controlled to achieve either refreshing or maintaining the data signal Vdata, thereby realizing the refresh rate control of the target pixel unit.

Figure 11:
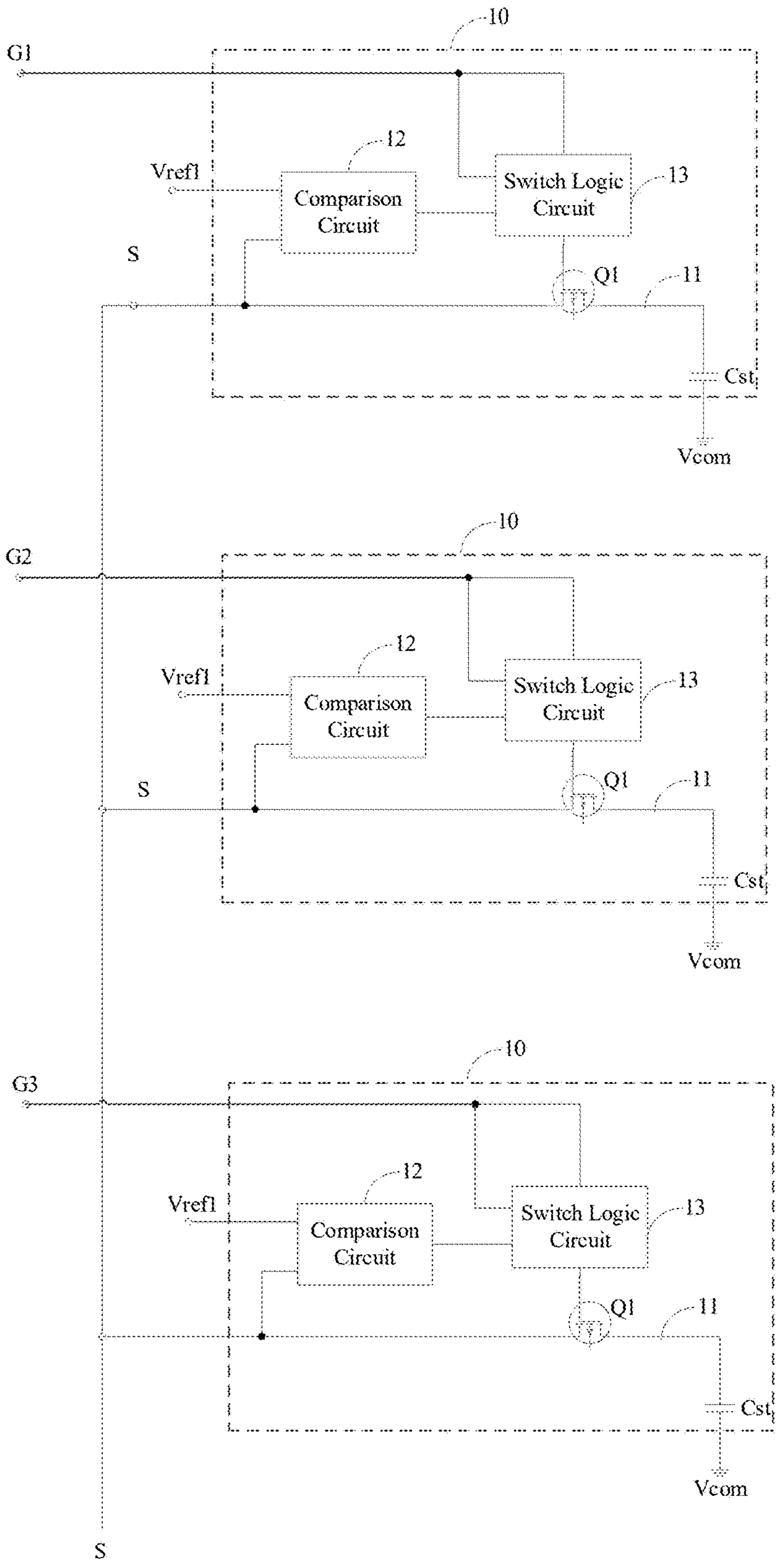
FIG. 11 is a first structural schematic diagram of a display panel provided by an embodiment of the present application.
Figure 12:
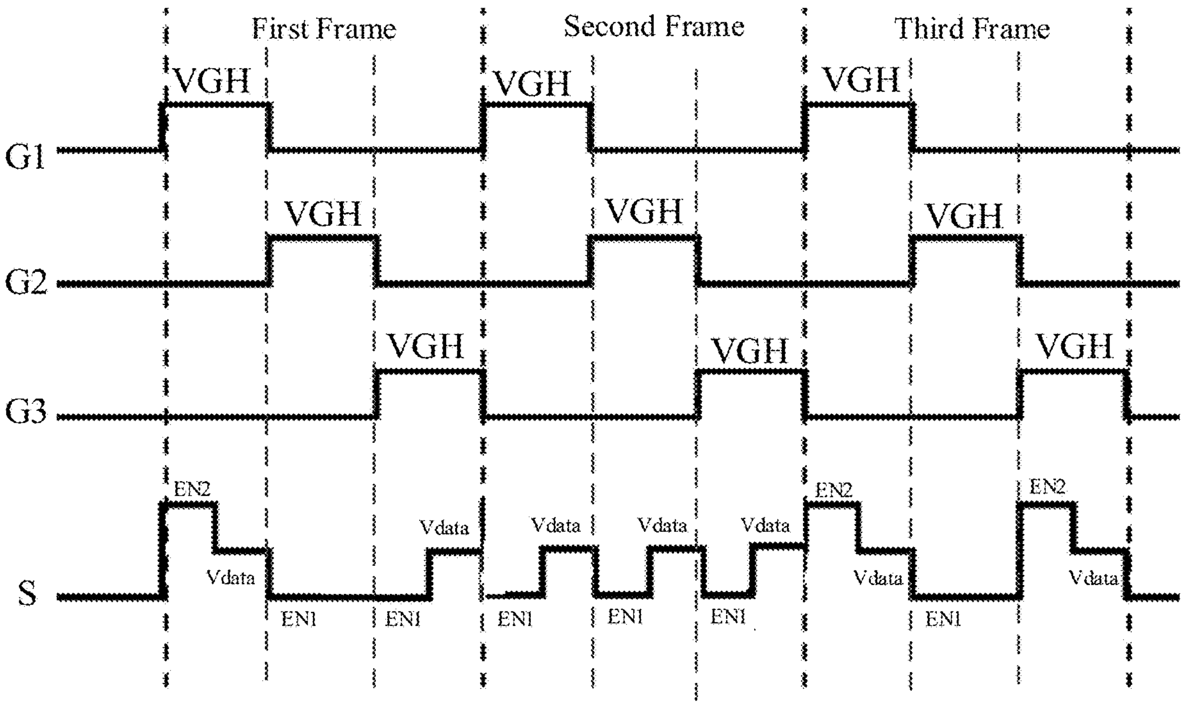
FIG. 12 is a schematic diagram of a fourth signal timing of the pixel unit provided by an embodiment of the present application.

When it is required to control different pixel units 10 in the same column to be switched to different refresh rates, for example, as shown in FIG. 11 and FIG. 12, when switching the pixel units 10 of a first row to a third row in the same column to different refresh rates in different frames, in this case, it may be operated as follow: in a first frame, when the pixel unit 10 of the first row is scanned, the second enable signal EN2 and the data signal Vdata of the first frame are output. The pixel unit 10 of the first row can write the data signal Vdata of the first frame and switch to a high refresh rate. When the pixel unit 10 of the second row is scanned, the first enable signal EN1 is output. At this time, the pixel unit 10 of the second row cannot write the data signal Vdata and remains at the data signal Vdata of the previous frame and switches to a low refresh rate. When the pixel unit 10 of the third row is scanned, the first enable signal EN1 is output. At this time, the pixel unit 10 of the third row cannot write the data signal Vdata and remains at the data signal Vdata of the previous frame and switches to a low refresh rate.

Similarly, when refreshing to the second frame, when the pixel unit 10 of the first row is scanned, the first enable signal EN1 is output. At this time, the pixel unit 10 of the first row cannot write the data signal Vdata and remains at the data signal Vdata of the first frame and switches to a low refresh rate. When the pixel unit 10 of the second row is scanned, the first enable signal EN1 is output. At this time, the pixel unit 10 of the second row cannot write the data signal Vdata and remains at the data signal Vdata of the first frame and switches to a low refresh rate. When the pixel unit 10 of the third row is scanned, the first enable signal EN1 is output. At this time, the pixel unit 10 of the third row cannot write the data signal Vdata and remains at the data signal Vdata of the first frame and switches to a low refresh rate.

Further, when refreshing to the third frame, when the pixel unit 10 of the first row is scanned, the second enable signal EN2 and the data signal Vdata of the third frame are output. The pixel unit 10 of the first row can write the data signal Vdata of the third frame and switches to a high refresh rate. When the pixel unit 10 of the second row is scanned, the first enable signal EN1 is output. At this time, the pixel unit 10 of the second row cannot write the data signal Vdata and remains at the data signal Vdata of the first frame and switches to a low refresh rate. When the pixel unit 10 of the third row is scanned, the second enable signal EN2 and the data signal Vdata of the third frame are output. The pixel unit 10 of the third row can write the data signal Vdata of the third frame and switches to a high refresh rate.

Thus, in different frame images, the refresh rate of different target pixel units in the same row can be adjusted and switched.

Figure 13:
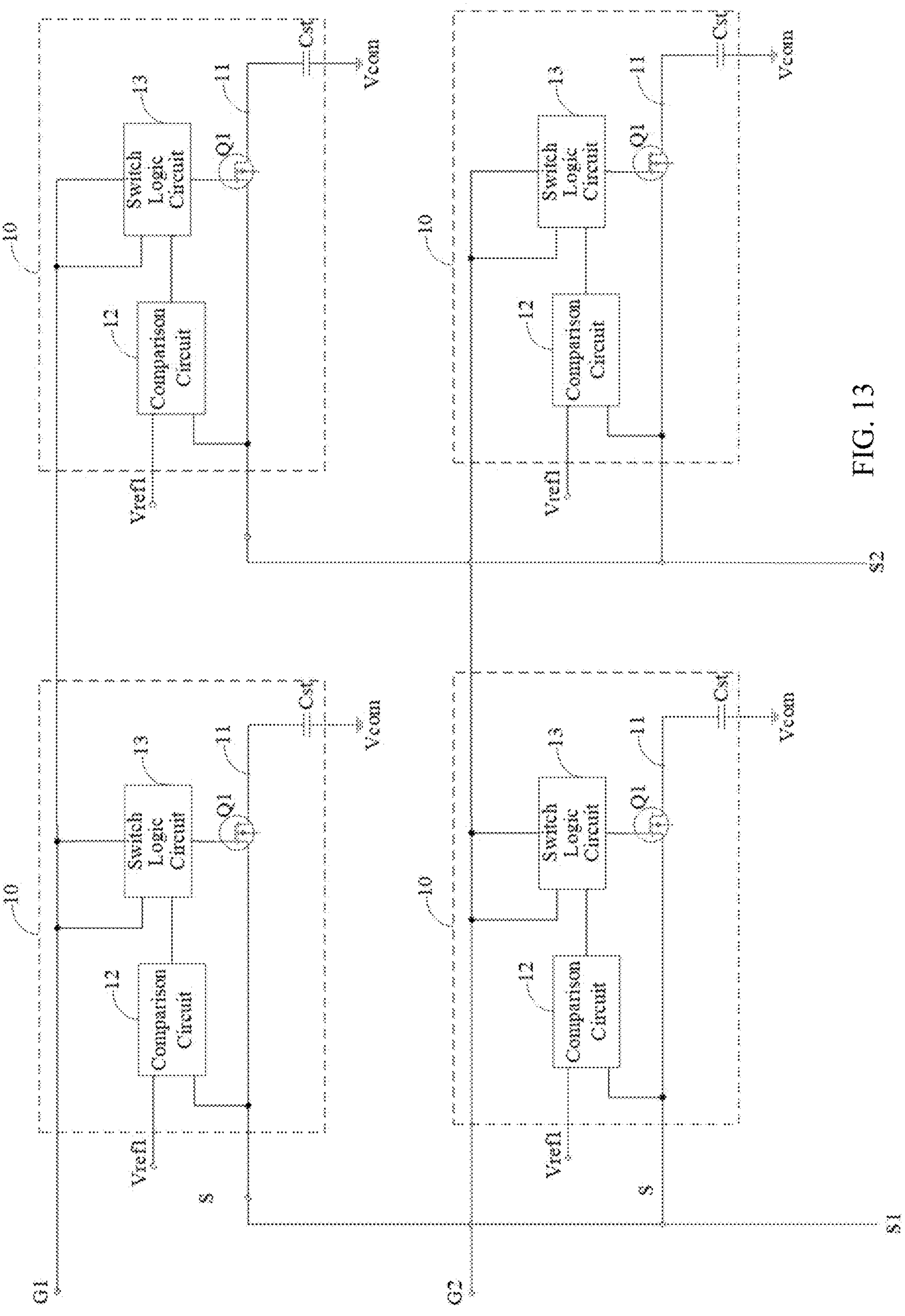
FIG. 13 is a second structural schematic diagram of the display panel provided by an embodiment of the present application.
Figure 14:
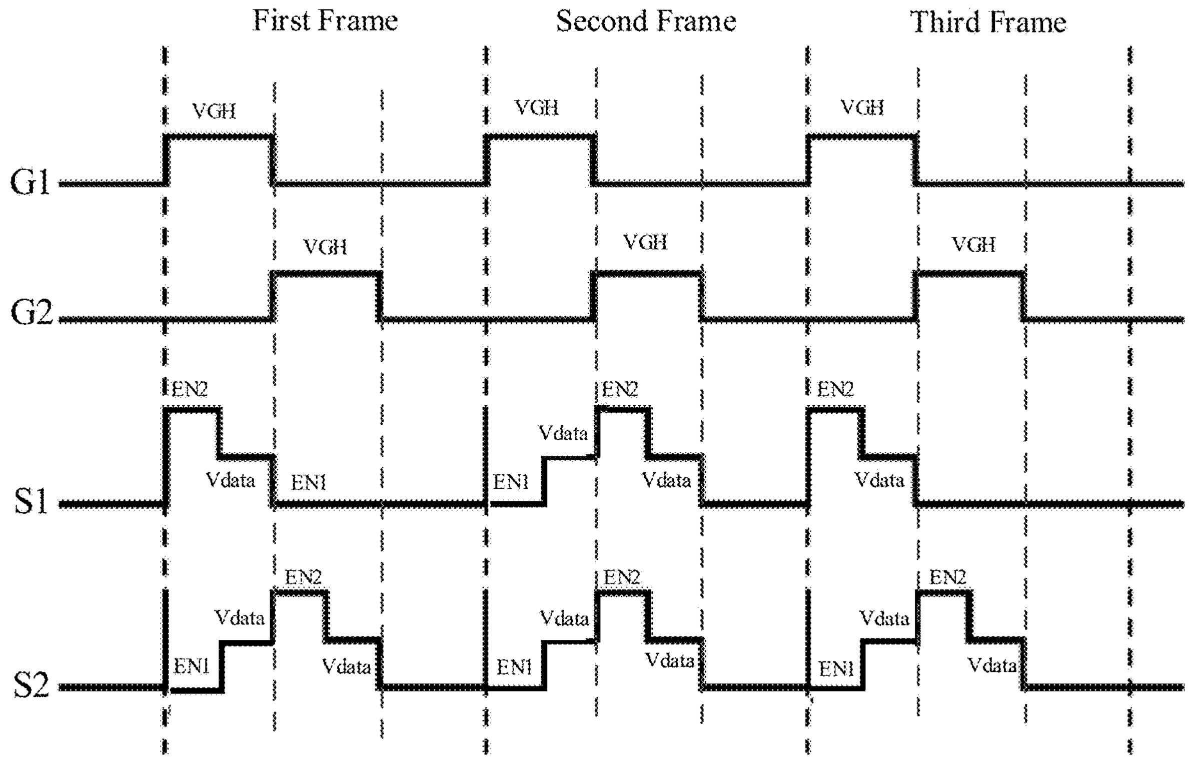
FIG. 14 is a schematic diagram of a fifth signal timing of the pixel unit provided by an embodiment of the present application.

When it is required to control different pixel units 10 in the same row to be switched to different refresh rates, as shown in FIGS. 13 and 14, in the first frame, the first scan line G1 inputs the row enable signal VGH, at this time, the first data line S1 writes the second enable signal EN2 and the data signal Vdata of the first frame, the pixel unit 10 at the first column of the first row can write the data signal Vdata of the first frame and is switched to the high refresh rate, and the second data line S2 writes the first enable signal EN1, the pixel unit 10 at the second column of the first row and cannot write the data signal Vdata, the data signal Vdata of the previous frame is maintained and switched to the low refresh rate.

Then, the second row is scanned, the second scan line G2 inputs the row enable signal VGH, at this time, the first data line S1 writes the first enable signal EN1, the pixel unit 10 at the first column of the second row cannot write the data signal Vdata, the data signal Vdata of the previous frame is maintained and switched to the low refresh rate, Meanwhile, the second data line S2 writes the second enable signal EN2 and the data signal Vdata of the first frame, and the pixel unit 10 at the second column of the second row can write the data signal Vdata of the first frame and switches to the high refresh rate. This process is repeated in sequence. During the progressive scanning, the writing of the data signal Vdata can be switched by toggling the enable signal level, to switch or maintain the refresh rate of the pixel unit 10.

It should be understood that the sequence numbers of the steps in the above embodiments do not imply a sequence of execution. The execution sequence of each process should be determined by its function and internal logic, and should not impose any limitation on the implementation process of the embodiments of the present invention.

Figure 15:
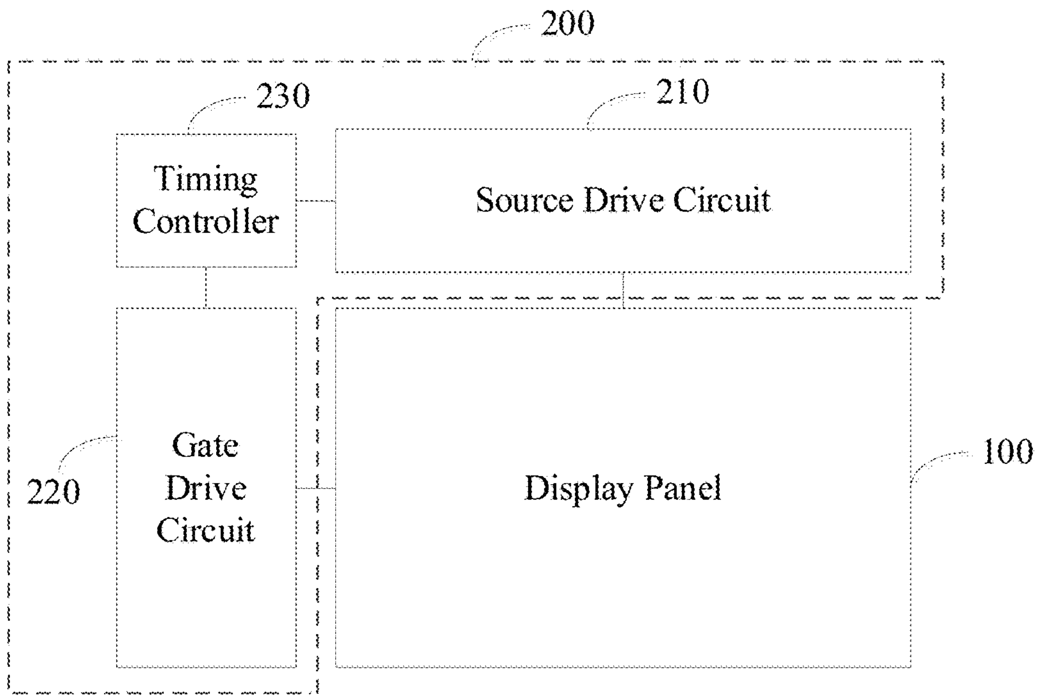
FIG. 15 is a structural schematic diagram of a drive circuit for a display panel and a display device provided by some embodiments of the present application.

In a third aspect, an embodiment of the present application provides a drive circuit 200 of a display panel, as shown in FIG. 15, the drive circuit 200 of the display panel includes a source drive circuit 210, a gate drive circuit 220 and a timing controller 230. The source drive circuit 210 is connected to a plurality of data lines S of the display panel 100 respectively. The gate drive circuit 220 is connected to the plurality of data lines S of the display panel 100 respectively.

The timing controller 230 is connected to the source drive circuit 210 and the gate drive circuit 220 respectively. The timing controller 230 is configured to output a control signal to the source drive circuit 210 and the gate drive circuit 220 to implement the drive method for the display panel 100.

In the embodiment, the source drive circuit 210 is configured to output the enable signal and the data signal Vdata, the enable signal and the data signal Vdata may be output by different driving chips or output by a single source driving chip in the source drive circuit 210. The gate drive circuit 220 is configured to output the row enable signal VGH row by row.

The timing controller 230, when a static image is presented in the target local area, analyzes characteristic values of subsequent images to determine whether changes occur in the target local area. When it is determined that the display content in the target local area remains unchanged, the target local area is set to a low refresh rate. At this time, the retention mode is switched to, and the source driver circuit 210 is controlled by the timing controller 230 to output the first enable signal EN1 to the target pixel units in the target local area, so as to control the target pixel units to maintain the data signal Vdata and the display image of the previous frame, and thus the low refresh rate is achieved.

When it is determined that the next frame in the target local area has a change, the target local area is set to a high refresh rate. At this time, the active mode is switched to, the source drive circuit 210 is controlled by the timing controller 230 to output the second enable signal EN2 to the target pixel units in the target local area, and output the data signal Vdata required by the target pixel units, so that the target pixel unit is controlled to switch to the data signal Vdata and the display image of the next frame, and thus the high refresh rate is achieved.

The present application also provides a display device, as shown in FIG. 15, the display device includes a display panel 100 and a drive circuit 200 for the display panel. For specific structures of the display panel 100 and the drive circuit 200 for the display panel, references may be made to the above embodiments. Since the display device adopts all technical schemes of the above embodiments, at least all beneficial effects brought by the technical schemes of the above embodiments are possessed, which will not be repeated here. The drive circuit 200 for the display panel is connected to the display panel 100.

The above embodiments are merely used to illustrate, rather than to limit, the technical schemes of the present application. Although the present application is described in detail with reference to the above embodiments, persons skilled in the art should understand that the technical schemes recorded in the above embodiments may still be modified, or some technical features may be equivalently substituted. These modifications or substitutions do not make the essence of the corresponding technical schemes deviate from the spirit and scope of the technical schemes of the embodiments of the present application, and thus should all be included within the protection scope of the present application.

What is claimed is:

1. A display panel, comprising a plurality of scan lines, a plurality of data lines and an array of pixel units, the pixel units each correspondingly connected to one of the plurality of scan lines and one of the plurality of data lines;

the pixel units each comprising:

a pixel electrode;

a storage capacitor, a first end of the storage capacitor being connected to the pixel electrode, and a second end of the storage capacitor being connected to a common signal terminal;

a first transistor connected between a corresponding data line and the pixel electrode;

a comparison circuit connected to the corresponding data line and a first reference voltage terminal, wherein the comparison circuit is configured to compare a signal on the corresponding data line with a first reference voltage at the first reference voltage terminal and output a comparison signal; and a switch logic circuit connected to an output end of the comparison circuit, a control end of the first transistor and a corresponding scan line, wherein the switch logic circuit is configured to trigger a connection between the corresponding scan line and the first transistor when both the comparison signal and a signal on the corresponding scan line are at a high level, or to trigger a disconnection between the corresponding scan line and the first transistor when one of the comparison signal and the signal on the corresponding scan line is at a low level.

2. The display panel according to claim 1, wherein the switch logic circuit comprises:

an AND gate, a first input end of the AND gate is connected to the corresponding scan line, and a second input end of the AND gate is connected to the output end of the comparison circuit; and a switch circuit connected in series between the corresponding scan line and the first transistor, a control end of the switch circuit is connected to an output end of the AND gate, the switch circuit is triggered to switch on by a high level and to switch off by a low level.

3. The display panel according to claim 2, wherein the AND gate comprises a first diode and a second diode;

a cathode of the first diode is connected to the corresponding scan line, an anode of the first diode, an anode of the second diode and a second reference voltage terminal are connected serving as a signal output terminal of the AND gate, a cathode of the second diode is connected to the output end of the comparison circuit, and a second reference voltage at the second reference voltage terminal is lower than a voltage of a row enable signal input to the corresponding scan line.

4. The display panel according to claim 2, wherein the switch circuit comprises a second transistor and a bootstrap capacitor;

a first end of the second transistor is connected to the corresponding scan line, a second end of the second transistor is connected to the control end of the first transistor, a control end of the second transistor and a first end of the bootstrap capacitor are connected serving as the control end of the switch circuit, and a second end of the bootstrap capacitor is grounded.

5. The display panel according to claim 1, wherein the comparison circuit comprises a third transistor, a fourth transistor, a fifth transistor and a resistor;

a first end of the third transistor is connected to the first reference voltage terminal, a second end of the third transistor, a first end of the resistor, a control end of the fourth transistor and a control end of the fifth transistor are connected in common, a control end of the third transistor is connected to the corresponding data line, a first end of the fourth transistor is connected to a second reference voltage terminal, a second end of the fourth transistor and a first end of the fifth transistor are connected to form the output end of the comparison circuit, and the second end of the fifth transistor is grounded.

6. A drive method for a display panel, the display panel, comprising a plurality of scan lines, a plurality of data lines and an array of pixel units, the pixel units each correspondingly connected to one of the plurality of scan lines and one of the plurality of data lines;

wherein each of the pixel units comprises:

a pixel electrode;

a storage capacitor, wherein a first end of the storage capacitor is connected to the pixel electrode, and a second end of the storage capacitor is connected to a common signal terminal;

a first transistor connected between a corresponding data line and the pixel electrode;

a comparison circuit connected to the corresponding data line and a first reference voltage terminal, wherein the comparison circuit is configured to compare a signal on the corresponding data line with a first reference voltage at the first reference voltage terminal and output a comparison signal; and a switch logic circuit connected to an output end of the comparison circuit, a control end of the first transistor and a corresponding scan line, wherein the switch logic circuit is configured to trigger a connection between the corresponding scan line and the first transistor when both the comparison signal and a signal on the corresponding scan line are at a high level, or to trigger a disconnection between the corresponding scan line and the first transistor when one of the comparison signal and the signal on the corresponding scan line is at a low level, wherein the drive method for the display panel comprises:

determining whether an image content of a next frame in a target local area of the display panel changes;

switching to a retention mode when the image content of the next frame in the target local area does not change, and during a next frame scan driving, outputting a first data signal of a corresponding magnitude and a row enable signal to a target pixel unit corresponding to the target local area, and controlling the pixel electrode of the target pixel unit to maintain a data signal of a previous frame; and switching to an active mode when the image content of the next frame in the target local area changes, and during the next frame scan driving, outputting a second data signal of a corresponding magnitude and the row enable signal to the target pixel unit corresponding to the target local area, and controlling the pixel electrode of the target pixel unit to input a data signal of a current frame.

7. The drive method for the display panel according to claim 6, wherein said switching to the retention mode when the image content of the next frame in the target local area does not change, and during the next frame scan driving, outputting the first data signal of the corresponding magnitude and the row enable signal to the target pixel unit corresponding to the target local area comprises:

in a first time period of the retention mode, outputting the row enable signal of a high level to the corresponding scan line, and outputting a first enable signal or outputting no signal to the corresponding data line, wherein a voltage of the first enable signal is lower than the first reference voltage; and in a second time period of the retention mode, outputting the row enable signal to the corresponding scan line, and outputting a data signal of the next frame or outputting no signal to the corresponding data line.

8. The drive method for the display panel according to claim 6, wherein said switching to the active mode when the image content of the next frame in the target local area changes, and during the next frame scan driving, outputting the second data signal of the corresponding magnitude and the row enable signal to the target pixel unit corresponding to the target local area comprises:

in a first time period of the active mode, outputting the row enable signal to the corresponding scan line, and outputting a second enable signal to the corresponding data line, wherein a voltage of the second enable signal is higher than the first reference voltage;

in a second time period of the active mode, outputting the row enable signal to the corresponding scan line, and outputting a data signal of the next frame to the corresponding data line, wherein the data signal of the next frame is output to the pixel electrode of the target pixel unit through the first transistor; and in a third time period of the active mode, outputting a row disable signal of a low level to the corresponding scan line, and controlling the pixel electrode of the target pixel unit to maintain the data signal of the current frame.

9. The drive method for the display panel according to claim 6, wherein the switch logic circuit comprises:

an AND gate, a first input end of the AND gate is connected to the corresponding scan line, and a second input end of the AND gate is connected to the output end of the comparison circuit; and a switch circuit connected in series between the corresponding scan line and the first transistor, a control end of the switch circuit is connected to an output end of the AND gate, the switch circuit is triggered to switch on by a high level and to switch off by a low level.

10. The drive method for the display panel according to claim 9, wherein the AND gate comprises a first diode and a second diode;

a cathode of the first diode is connected to the corresponding scan line, an anode of the first diode, an anode of the second diode and a second reference voltage terminal are connected serving as a signal output terminal of the AND gate, a cathode of the second diode is connected to the output end of the comparison circuit, and a second reference voltage at the second reference voltage terminal is lower than a voltage of a row enable signal input to the corresponding scan line.

11. The drive method for the display panel according to claim 9, wherein the switch circuit comprises a second transistor and a bootstrap capacitor;

a first end of the second transistor is connected to the corresponding scan line, a second end of the second transistor is connected to the control end of the first transistor, a control end of the second transistor and a first end of the bootstrap capacitor are connected serving as the control end of the switch circuit, and a second end of the bootstrap capacitor is grounded.

12. The drive method for the display panel according to claim 6, wherein the comparison circuit comprises a third transistor, a fourth transistor, a fifth transistor and a resistor;

a first end of the third transistor is connected to the first reference voltage terminal, a second end of the third transistor, a first end of the resistor, a control end of the fourth transistor and a control end of the fifth transistor are connected in common, a control end of the third transistor is connected to the corresponding data line, a first end of the fourth transistor is connected to a second reference voltage terminal, a second end of the fourth transistor and a first end of the fifth transistor are connected to form the output end of the comparison circuit, and the second end of the fifth transistor is grounded.

13. A display device, comprising:

a display panel, comprising a plurality of scan lines, a plurality of data lines and an array of pixel units, the pixel units each correspondingly connected to one of the plurality of scan lines and one of the plurality of data lines; and the pixel units each comprising:

a pixel electrode;

a storage capacitor, a first end of the storage capacitor being connected to the pixel electrode, and a second end of the storage capacitor being connected to a common signal terminal;

a first transistor connected between a corresponding data line and the pixel electrode;

a comparison circuit connected to the corresponding data line and a first reference voltage terminal, wherein the comparison circuit is configured to compare a signal on the corresponding data line with a first reference voltage at the first reference voltage terminal and output a comparison signal; and a switch logic circuit connected to an output end of the comparison circuit, a control end of the first transistor and a corresponding scan line, wherein the switch logic circuit is configured to trigger a connection between the corresponding scan line and the first transistor when both the comparison signal and a signal on the corresponding scan line are at a high level, or to trigger a disconnection between the corresponding scan line and the first transistor when one of the comparison signal and the signal on the corresponding scan line is at a low level; and a drive circuit for the display panel, connected to the display panel and comprising a source drive circuit, a gate drive circuit and a timing controller, wherein the source drive circuit is connected to the plurality of data lines of the display panel respectively, and the gate drive circuit is connected to the plurality of data lines of the display panel respectively; and wherein the timing controller is connected to the source drive circuit and the gate drive circuit respectively, and is configured to output a control signal to the source drive circuit and the gate drive circuit to implement the drive method for the display panel according to claim 6.

14. The display device according to claim 13, wherein the switch logic circuit comprises:

an AND gate, a first input end of the AND gate is connected to the corresponding scan line, and a second input end of the AND gate is connected to the output end of the comparison circuit; and a switch circuit connected in series between the corresponding scan line and the first transistor, a control end of the switch circuit is connected to an output end of the AND gate, the switch circuit is triggered to switch on by a high level and to switch off by a low level.

15. The display device according to claim 14, wherein the AND gate comprises a first diode and a second diode;

a cathode of the first diode is connected to the corresponding scan line, an anode of the first diode, an anode of the second diode and a second reference voltage terminal are connected serving as a signal output terminal of the AND gate, a cathode of the second diode is connected to the output end of the comparison circuit, and a second reference voltage at the second reference voltage terminal is lower than a voltage of a row enable signal input to the corresponding scan line.

16. The display device according to claim 14, wherein the switch circuit comprises a second transistor and a bootstrap capacitor;

a first end of the second transistor is connected to the corresponding scan line, a second end of the second transistor is connected to the control end of the first transistor, a control end of the second transistor and a first end of the bootstrap capacitor are connected serving as the control end of the switch circuit, and a second end of the bootstrap capacitor is grounded.

17. The display device according to claim 13, wherein the comparison circuit comprises a third transistor, a fourth transistor, a fifth transistor and a resistor;

a first end of the third transistor is connected to the first reference voltage terminal, a second end of the third transistor, a first end of the resistor, a control end of the fourth transistor and a control end of the fifth transistor are connected in common, a control end of the third transistor is connected to the corresponding data line, a first end of the fourth transistor is connected to a second reference voltage terminal, a second end of the fourth transistor and a first end of the fifth transistor are connected to form the output end of the comparison circuit, and the second end of the fifth transistor is grounded.

* * * * *